(12) United States Patent
Lautner

(10) Patent No.: US 6,520,173 B2
(45) Date of Patent: Feb. 18, 2003

(54) PORTABLE SOLID-FUEL CAMP-STOVE

(75) Inventor: Robert Martin Lautner, P.O. Box 66215, Scotts Valley, CA (US) 95067

(73) Assignee: Robert Martin Lautner, Atlanta, GA (US)

( * ) Notice: Subject to any disclaimer, the term of this patent is extended or adjusted under 35 U.S.C. 154(b) by 5 days.

(21) Appl. No.: 09/838,816

(22) Filed: Apr. 19, 2001

(65) Prior Publication Data

US 2001/0035175 A1 Nov. 1, 2001

Related U.S. Application Data

(60) Provisional application No. 60/201,276, filed on May 2, 2000.

(51) Int. Cl.[7] .............................. F24B 1/26; F24B 21/00; A47J 33/00; F24C 1/16
(52) U.S. Cl. .................. 126/9 R; 126/25 R; 126/25 B; 126/304 R; 126/40; 126/77; 126/9 B
(58) Field of Search .............................. 126/25 R, 25 B, 126/9 R, 9 B, 38, 39 B, 77, 40, 304 R, 140; 431/252; 110/195, 239

(56) References Cited

U.S. PATENT DOCUMENTS

| | | | | |
|---|---|---|---|---|
| 25,832 A | * | 10/1859 | Hyde | 431/354 |
| 104,078 A | * | 6/1870 | Streett | 431/252 |
| 635,567 A | * | 10/1899 | Miller | 431/252 |
| 1,062,640 A | * | 5/1913 | Eimer | |
| 1,295,907 A | * | 3/1919 | Le Compte | |
| 1,298,762 A | * | 4/1919 | Milligan | |
| 1,559,521 A | * | 10/1925 | Ferruse | |
| 1,679,359 A | * | 6/1926 | Jessen | |
| 1,614,785 A | * | 1/1927 | Fraser | |
| 1,774,111 A | * | 8/1930 | Smith | |
| 1,925,682 A | * | 9/1933 | Upright et al. | |
| 2,363,098 A | * | 11/1944 | Tullis | |
| 2,488,014 A | * | 11/1949 | Higman | |
| 2,866,883 A | * | 12/1958 | Borden | 126/25 B |
| 2,950,669 A | * | 8/1960 | Terry | 126/25 B |
| 2,983,269 A | * | 5/1961 | Montesano | 126/25 R |
| 3,327,697 A | * | 6/1967 | Berlant | 126/25 R |
| 3,384,066 A | * | 5/1968 | Tufts | 126/9 R |
| 3,647,323 A | * | 3/1972 | Thomas | 126/25 B |
| 3,765,397 A | * | 10/1973 | Henderson | 126/25 B |
| 3,868,943 A | | 3/1975 | Hottenroth et al. | |
| 4,026,265 A | * | 5/1977 | Spadaro | 126/25 B |
| 4,156,542 A | * | 5/1979 | Holleman | 239/530 |
| 4,385,619 A | * | 5/1983 | Casinelli | |
| 4,604,986 A | * | 8/1986 | Barnes | 126/25 B |
| 4,810,173 A | * | 3/1989 | Thomson et al. | 126/25 B |
| 4,909,235 A | * | 3/1990 | Boetcker | 126/25 C |
| 5,176,124 A | * | 1/1993 | Wrasse | 126/25 R |
| 5,842,463 A | | 12/1998 | Hall | |
| 5,915,371 A | | 6/1999 | Hering | |
| 6,009,867 A | * | 1/2000 | Walton | 126/25 B |

FOREIGN PATENT DOCUMENTS

| | | | | |
|---|---|---|---|---|
| FR | 2 672 787 | * | 8/1992 | 126/9 R |
| GB | 3799 | * | of 1908 | 126/59.5 |
| WO | WO 9/21465 | * | 5/1999 | 126/25 R |
| WO | WO 9937955 | | 7/1999 | |

* cited by examiner

*Primary Examiner*—Carl D. Price

(57) ABSTRACT

A portable solid-fuel burning camp-stove with a unique air supply system that allows for sufficient thermal power output to facilitate cooking while keeping the size of the combustion chamber small enough to allow for acceptable packing weight for backcountry hiking. Pack stoves powered by gas or liquid fuels have the major disadvantages of the need to bring fuel and limited fuel supply. Solid fuel stoves have the advantage of being able to use fuel straight from nature in the form of wood, there is no need to carry fuel, generally these stoves are too heavy for backpacking since they need a large combustion chamber which makes these stoves to heavy for back packing. This invention allows for adequate combustion in an acceptably small chamber by blowing additional air into the combustion chamber for a higher combustion rate. The air is blown in by mouth through a hose and nozzle arrangement, thereby eliminating the need for extra air-pump hardware.

1 Claim, 1 Drawing Sheet

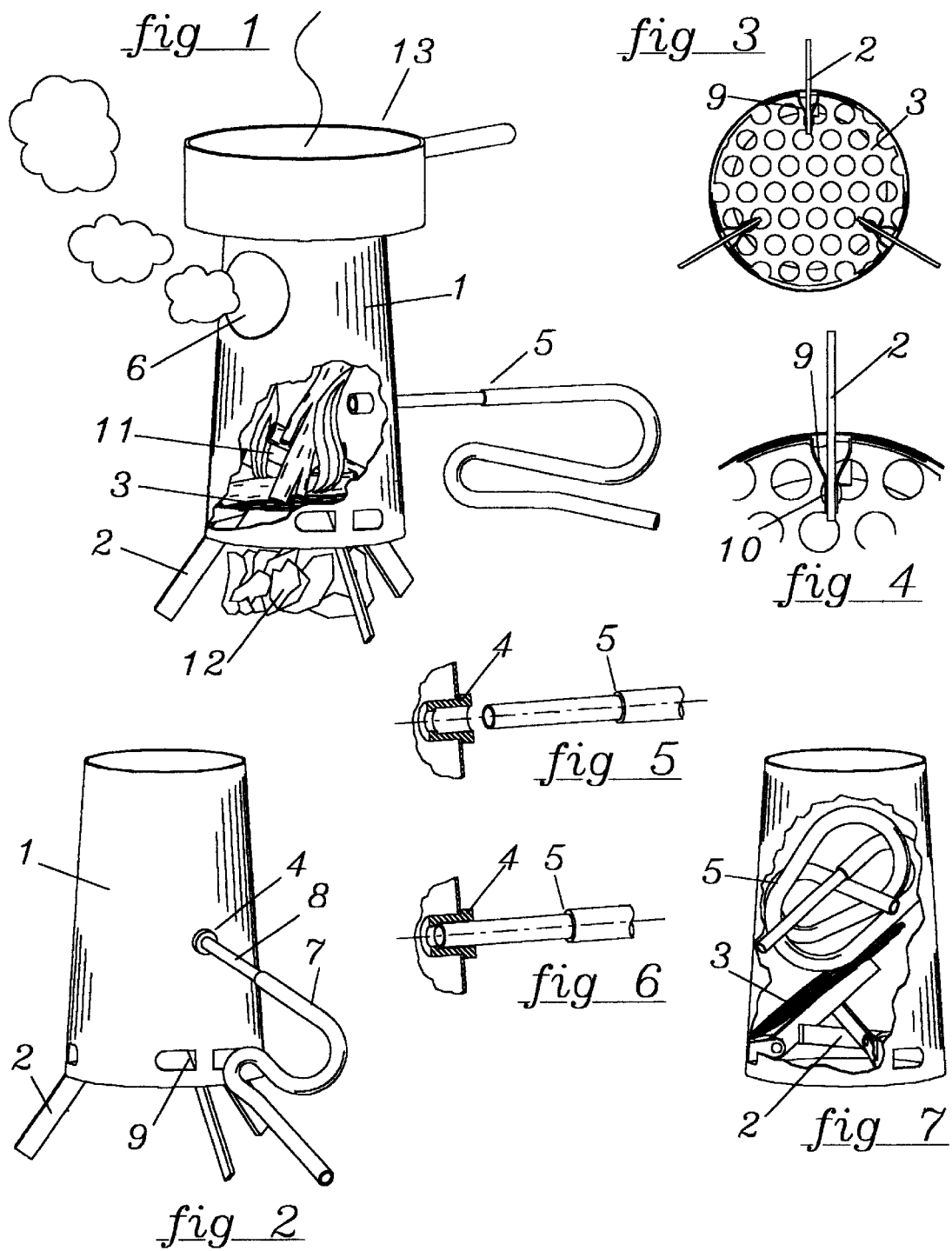

PORTABLE SOLID-FUEL CAMP-STOVE

RELATED APPLICATIONS

This application claims the benefit of U.S. Provisional Application No. 60/201,276 filed on May 2, 2000.

BACKGROUND OF THE INVENTION

The majority of backpacking stoves in existence function by burning some type of highly combustible gas or liquid fuel such as propane, butane, or ethanol. While these types of stoves are light enough for backpacking they do require the user to carry fuel which adds to the pack weight. Fuel availability is also limited to how much fuel the user decides to bring. Stoves that use solid fuel (wood) gathered on site as a fuel liberate the backpacker from the need to carry fuel into the backcountry and guarantee the availability of fuel indefinitely. The use of wood as a fuel however requires a large combustion chamber that makes these types of stoves too large and too heavy for backpacking.

Many designs exist for collapsible stoves of this type. While these designs reduce the pack size of the stove they do not reduce pack weight, in many cases they increase pack weight instead due to various joint connection hardware. Another major drawback of collapsible solid fuel stoves is that the inner surfaces of the combustion chamber that during combustion accumulate heavy deposits of soot often become exposed to outside objects when in a collapsed or disassembled state.

However with a forced inflow of air, sufficient combustion can be achieved in a small enough combustion chamber to allow for a light enough and small enough stove to be used for backpacking without the need for a collapsible combustion chamber. This has been tried in the past using battery powered electric fans that blow air into the combustion chamber. This has eliminated the need to bring fuel but created a need to bring batteries instead, these types of stoves are also at risk of suffering mechanical and electric breakdowns.

Examples of previous patents of designs of wood burning campstoves are listed below. The present invention presents a backpacking stove with a small enough combustion chamber to be used for backpacking and a completely human powered air intake system with no electric components.

Prior Art:

U.S. Pat. No. 5,915,371 to Hering (1999) discloses a cylindrical collapsible stove powered by solid fuel. This stove is based on the flue effect but does not have a forced inflow of air. By being made of two halves that come apart for small size during transportation it exposes the soot covered inner walls of the combustion chamber to other objects.

U.S. Pat. No. 5,842,463 to Hall (1998) discloses a stove with an outer and inner wall, air is heated between the two walls by thermal conduction before entering the combustion chamber inside the inner wall, the preheated air then allows for a more complete combustion. While this concept raises the efficiency enough to allow for a small combustion chamber it adds another shell and thereby increases the weight of the stove.

U.S. Pat. No. 1,298,762 to Milligan (1919) discloses a basic cylindrical solid fuel stove based on the flue effect. The lack of a combustion enhancing system necessitates a large combustion chamber.

U.S. Pat. No. 3,868,943 to Hottenroth et al. (1975) discloses a solid fuel stove with a forced air inflow by means of a battery powered electric fan blower. While this concept allows for a small combustion chamber it requires a battery-motor-fan assembly that adds weight to the stove. This type of stove is also subject to electromechanical malfunctions and depleted batteries leaving the stove non-operational.

World Pat. No. WO 9937955 to Kunzi (1999) discloses a foldable cooking stove composed of flat metal sheets that fold into a metal box that acts as a combustor. The folding method of this stove is such that no sooted surfaces come in contact with other surfaces or objects thereby eliminating the problem of soot contamination. The need for a large combustion chamber however remains.

BRIEF SUMMARY OF THE INVENTION

The portable solid-fuel camp-stove described herein is small enough and light enough to be used for backpacking. It is powered by small pieces of wood that can be gathered around a campsite. Solid fuel stoves generally require a large combustion chamber, a preheating chamber, or an electromechanical fan system, all of which add significant weight and make these stoves too heavy for backpacking, to provide sufficient power output for cooking. The present invention has a user powered blow-hose air input that allows for sufficient combustion in a small enough combustion chamber to allow for the low weight required for backpacking.

BRIEF DESCRIPTION OF THE VIEWS OF THE DRAWING

FIG. 1. Shows the stove in use with a view into the combustion chamber.

FIG. 2. Shows the stove from behind.

FIG. 3. Shows the stove viewed from the bottom.

FIG. 4. Magnification of leg to bracket assembly.

FIG. 5. Magnified cross section of the coupling with the hose unit not inserted.

FIG. 6. Magnified cross section of the coupling with the hose unit inserted into it.

FIG. 7. Shows the stove with its legs folded up and the hose unit stored inside.

DETAILED DESCRIPTION OF THE INVENTION

The components of the stove are the combustion chamber (1), the legs(2), the suspension screen(3), the coupling(4), and the hose unit(5).

The combustion chamber(1) makes up the body of the stove it is made up of a conical metal cylinder, open n both ends, with an exhaust hole(6) in the wall near the top rim of the combustion chamber. The coupling(4) penetrates the combustion chamber on the opposite side of the exhaust hole(6). The hose unit(5) is made up of the flexible hose(7) that is attached air tightly to the-nozzle tube(s) as seen in FIG. 2. The nozzle tube(8) is made of a material of low thermal conductivity and ability to withstand the heat generated in the combustion chamber. The free end of the nozzle tube(8) fits loosely into the coupling(4). The hose unit(5) can easily be inserted into the coupling(4) as in FIG. 6 and removed from the coupling(4) as in FIG. 5. During transportation or storage the hose unit may be wrapped up and inserted into the top opening of the combustion chamber as in FIG. 7.

The bottom of the combustion chamber has 3 sets of cut out bracket pairs(9) evenly spaced along the lower rim of the combustion chamber as seen in FIG. 3 between which the legs(2) are attached with a fastener(10) through a hole in each bracket and a corresponding hole in the leg resulting in a set of 3 hinged legs as can be seen in FIG. 4. These legs can be folded out for the stove to stand on as seen in FIG. 1 and FIG. 2, or into the combustion chamber for storage and transportation as in FIG. 7.

The bracket pairs(9) also serve as rests for the suspension screen(3). The suspension screen is comprised of a round piece of perforated sheet metal with a diameter slightly smaller than the inner diameter of the combustion chamber at the resting position of the suspension screen, the suspension screen may also be made up of a metal grid or mesh. When the stove is in use the suspension screen(3) rests loosely on the bracket pairs(9) as in FIG. 1, during transportation or storage when the legs(2) are folded into the combustion chamber the suspension screen is pushed up deeper into the combustion chamber by the legs as seen in FIG. 7, and remains there until the legs are folded back down and the suspension screen moves back down to its resting position.

Operation:

The stove is placed on the ground resting on its 3 folded out legs(2). Combustion material (11) such as twigs, small pieces of wood, or charcoals are dropped through the top opening of the combustion chamber(1) and end up suspended on the suspension screen(3) as seen in FIG. 1. Primary ignition material(12) such as crumbled up paper, dry grass, or dry leaves is placed on the ground under the suspension screen as in FIG. 1 and is ignited by the user using an external flame source such as a match or lighter.

Air now flows from under the combustion material through the suspension screen(3) into the combustion chamber where secondary ignition and consequent combustion takes place. Exhaust gases and smoke exit through the top opening of the combustion chamber and the exhaust hole(6) on the side of the combustion chamber. To aid in the ignition and acceleration of the rate of combustion of the combustion material extra oxygen is pumped into the combustion chamber by the user inserting the nozzle tube(8) end of the hose unit(5) into the coupling and blowing air by mouth into the other end of the hose unit.

When desirable temperature is reached a cooking pot(13) may be placed resting on the top rim of the combustion chamber(1), exhaust gases and smoke then exit through the exhaust hole(6) only. To increase the rate of combustion and consequently cooking temperature more air may be blown into the hose by the user. Additional fuel may be added into the combustion chamber either directly through the exhaust hole(6) or through the top opening by briefly removing the cooking pot.

I claim:

1. A stove comprising a vertically positioned combustion chamber defined by a hollow tapered tubular shape where said hollow tapered tubular shape is open in both ends, where said hollow tapered tubular shape is comprised of a conical wall, and where said hollow tapered tubular shape has an inside defined by interior of said wall and where said hollow tapered tubular shape has an outside defined by exterior of said wall, and where said hollow tapered tubular shape has a top rim where said top rim is round and has a top diameter, and where said hollow tapered tubular shape has a bottom rim where said bottom rim is round and has a bottom diameter, where said top diameter is smaller than said bottom diameter, and where said hollow tapered tubular shape has at least one exhaust opening for expulsion of exhaust gases, where said exhaust opening is positioned closer to said top rim than to said bottom rim of said hollow tapered tubular shape, and where 3 legs are attached to said inside of said wall, where each of said 3 legs are clamped between a pair of bent out tongue shaped cut-outs in said wall, where said legs are clamped to said tongue shaped cut-outs by means of a fastener in such a way that said legs are allowed to pivot and may be folded into said interior if said hollow tapered tubular shape during transportation or storage of said stove, and where said 3 legs extend below said bottom rim when pivoted down, and where said combustion chamber has an air intake hole comprising an aperture in said wall, and where said combustion chamber has a chamber floor comprising a screen that allows air to pass through freely from below while providing for suspension of solid combustion material, where said chamber floor rests on said tongue shaped cut-outs, and where said stove has a nozzle and hose assembly, where said nozzle and hose assembly is comprised of a flexible hose attached to a nozzle, where said nozzle is comprised of a hollow metal tube, where said metal tube has an outer diameter, where said outer diameter of said metal tube is such that said metal tube can be easily inserted into said air intake hole and said metal tube can easily be removed from said air intake hole.

* * * * *